United States Patent Office
3,718,667
Patented Feb. 27, 1973

3,718,667
2,3-DISUBSTITUTED LEVULINALDEHYDE COMPOUNDS
Donald P. Strike, Rosemont, and Herchel Smith, Bryn Mawr, Pa., assignors to American Home Products Corporation, New York, N.Y.
No Drawing. Division of application Ser. No. 876,116, Nov. 12, 1969, which is a continuation-in-part of application Ser. No. 765,020, Oct. 4, 1968, which in turn is a continuation-in-part of application Ser. No. 702,185, Feb. 1, 1968, all now abandoned. This application Apr. 15, 1971, Ser. No. 134,469
Int. Cl. C07d 7/04; C07c 59/32
U.S. Cl. 260—345.8        1 Claim

ABSTRACT OF THE DISCLOSURE 4,5-disubstituted-3-hydroxycyclopentanones (I) are prepared by hydrogenolyzing the corresponding 4,5-disubstituted-2,3-epoxycyclopentanone (IV) which in turn is provided by reacting the corresponding 4,5-disubstituted-2-cyclopenten-1-one (III) with alkaline hydrogen peroxide. Compounds (III) are prepared by cyclizing the corresponding 2,3-disubstituted levulinaldehyde (II) with a base. The products of the process are biologically active, especially compound (I) substituted in the 4-position with 3'-hydroxyoctyl and in the 5-position with 6'-carboxyhexyl. This compound has prostaglandin-like activity, especially blood pressure lowering and bronchodilator activity, and is a totally-synthetic dihydroprostaglandin $E_1$ (dihydro $PGE_1$). The processes of the invention may also be used to obtain compounds with prostaglandin-like activity from appropriately substituted naturally occurring cyclopentanones, e.g. those isolated from the Caribbean gorgonian, Plexaura homomalla.

This application is a division of U.S. patent application Ser. No. 876,116, filed Nov. 12, 1969, which is a continuation-in-part of application Ser. No. 765,020, filed Oct. 4, 1968, which is in turn a continuation-in-part of application Ser. No. 702,185, filed Feb. 1, 1968, all three prior applications now abandoned.

This invention relates to valuable organic compounds, to processes for their preparation, and to intermediates useful in said processes. More particularly, it is concerned with 4,5-disubstituted-3-hydroxycyclopentanones, which have valuable pharmacological properties; with the corresponding 2,3-epoxides, and other valuable intermediates therefor; and with the processes to prepare said compounds from known starting materials.

BACKGROUND OF THE INVENTION

The compounds contemplated to be provided by the instant invention are 4,5 - disubstituted - 3 - hydroxycyclopentanones of Formula I:

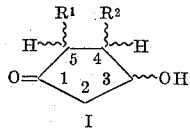

I wherein $R^1$ and $R^2$ are alkyl radicals or alkyl radicals monosubstituted with carboxy, carbo(lower)alkoxy, tetrahydropyranyloxy, hydroxy or (lower)acyloxy, the alkyl radicals containing from about 1 to about 20 carbon atoms. Compounds of Formula I are pharmacologically active. In this connection, special mention is made of the isomer of the compound of Formula I wherein the hydrogen (H) atoms at the 4- and 5-positions are in the trans-stereochemical relationship and wherein $R^2$ is 3'-hydroxyoctyl and $R^1$ is 6'-carboxyhexyl. This compound, also known as dihydroprostaglandin $E_1$ (dihydro $PGE_1$) possesses potent blood pressure lowering, bronchodilating and other pharmacodynamic activities. Its ureide and thiosemicarbazone derivatives also have bronchodilating activity.

The term "prostaglandin-like activity" is used by those skilled in the art particularly to describe hypotensive and smooth muscle stimulating activity demonstrated by substituted cyclopentane derivatives having the basic prostaglandin-type structure. This activity was discovered by Von Euler, Arch. Exp. Pathol. Pharmakol., 175, 78 (1934) in lipid-soluble acids extracted in small amounts from the vesicular glands of sheep, and in the seminal fluid of monkeys, sheep and goats. The structure of one of these acids with prostaglandin-like activity was elucidated by G. Bergstrom and J. Sjovall, Acta Chem. Scand., 14, 1693, 1701, 1706 (1960). The compound, 7-[3α-hydroxy-2-(3-hydroxy-1-octenyl)-5-oxocyclopentyl]-heptanoic acid, also called $PGE_1$, was obtained in pure crystalline form, and then in smaller amounts, only after organization of a program for the collection of frozen glands of sheep in several countries in the northern hemisphere. With this source of $PGE_1$ as starting material, it was then found (S. Bergstrom and J. Sjovall, United Kingdom patent specification No. 1,040,545) that $PGE_1$ could be hydrogenated using known catalysts for hydrogenating ethenoid unsaturation, for example, platinum catalyst, to the corresponding saturated acid, dihydro $PGE_1$, and that this compound possessed valuable prostaglandin-like activity. Other workers sought means to provide dihydro $PGE_1$ and similar compounds without the need to isolate $PGE_1$ from animal tissue and secretions. Thus, P. F. Beal, G. S. Fonken and J. E. Pike, in U.S. 3,296,091, describe the bioconversion of arachidonic acid by incubation with sheep vesicular gland tissue into $PGE_1$ and disclose that the dihydro $PGE_1$ can be prepared by hydrogenation, and that it has prostaglandin-like activity. In a typical example, the homogenate from 18.7 kg. of tissue was used to convert only 35.3 g. of arachidonic acid into a mixture of four prostaglandins, only one of which was $PGE_1$. In addition to the prostaglandin-like activity reported for dihydro $PGE_1$, M. Lapidus, N. H. Grant, M. E. Rosenthale and H. E. Alburn, in U.S. patent application, Ser. No. 672,728, filed Oct. 4, 1967 describe and claim the ureido derivative thereof and in U.S. patent application, Ser. No. 672,697, filed Oct. 4, 1967, describe and claim the thiosemicarbazone derivative thereof, and disclose that both of these compounds are highly potent bronchodilating agents. In the present state of the art, as exemplified by the references cited above, prostaglandins are obtained only in very small quantities by isolation from tissues by biosyntheses, or by total syntheses, or by total syntheses, see, for example, George Just and Chaim Simonovitch, Tetrahedron Letters, No. 22, 2093 (1967); and P. F. Beal III, J. C. Babcock, F. H. Lincoln, J. Am. Chem. Soc., 88, 3131 (1966); and E. J. Corey et al., ibid., 90, 3245, 3247 (1968). A clear need, therefore, exists for improved means to provide these active and useful compounds. The present invention provides such a means, being concerned with a totally synthetic process to make the 4,5-disubstituted-3-hydroxy cyclopentanone ring system present in the basic prostaglandin-type structure as hereinafter defined.

It is a primary object of the present invention, therefore, to provide 4,5-disubstituted-3-hydroxycyclopentanones by total synthesis from readily accessible starting materials.

It is another object to provide 4,5-disubstituted-3-hydroxycyclopentanones with prostaglandin-like activity in high yield from readily accessible starting materials including those of natural origin.

Still another object of this invention is to provide valuable intermediates useful in a totally synthetic process to prepare 4,5-disubstituted-3-hydroxycyclopentanones, such as dihydro PGE₁.

DESCRIPTION OF THE INVENTION

These and other objects readily apparent to those skilled in the art are easily achieved by practice of the means of the instant invention which is, in essence:

First.—A process for the preparation of a 4,5-disubstituted-3-hydroxycyclopentanone compounds of the formula:

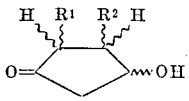

wherein $R^1$ and $R^2$ are alkyl radicals or alkyl radicals mono-substituted with carboxy, carbo(lower)alkoxy, tetrahydropyranyloxy, hydroxy, or (lower)acyloxy, the alkyl radicals containing from about 1 to about 20 carbon atom, which comprises reacting a 4,5-disubstituted-2,3-epoxycyclopentanone compound of the formula:

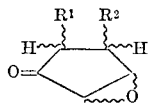

wherein $R^1$ and $R^2$ are as defined above, with hydrogen in the presence of a catalyst until hydrogenolysis and formation of said 4,5-disubstituted-3-hydroxycyclopentanone is substantially complete.

Special mention is made of a number of valuable embodiments of this invention. These are:

Second.—A process as first above defined wherein 4-(3'-hydroxy - octyl)-5-(6'-carboxyhexyl)-3-hydroxycyclopentanone is prepared by reacting 4-(3'-hydroxyoctyl)-5-(6'-carboxyhexyl)-2,3-epoxycyclopentanone with hydrogen in the presence of a palladized charcoal catalyst;

Third.—A process as first above defined wherein 4-(3'-tetrahydropyranyloxyoctyl) - 5 - (6'-carboxyhexyl)-3-hydroxycyclopentanone is prepared by reacting 4-(3'-tetrahydropyranyloxyoctyl) - 5-(6'-carboxyhexyl)-2,3-epoxycyclopentanone with hydrogen in the presence of a palladized charcoal catalyst.

Fourth.—A process as third above defined including the step of reacting said 4-(3'-tetrahydropyranyloxyoctyl)-5-(6'-carboxyhexyl)-3-hydroxycyclopentanone with an acidic hydrolyzing agent until formation of 4-(3'-hydroxyoctyl)-5-(6'-carboxyhexyl)-3-hydroxycyclopentanone is substantially complete. The second and fourth embodiments provide the valuable compound, dihydro PGE₁, and its stereoisomers.

Fifth.—A process as first above defined wherein 4,5-dimethyl-3-hydroxycyclopentanone is prepared by reacting 4,5-dimethyl-2,3-epoxycyclopentanone with hydrogen in the presence of a palladized charcoal catalyst.

Sixth.—A process as first above defined wherein is included the step of preparing said 4,5-disubstituted-2,3-epoxycyclopentanone compound by a process which comprises contacting a 4,5-disubstituted-2-cyclopenten-1-one of the formula:

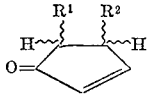

wherein $R^1$ and $R^2$ are alkyl radicals or alkyl radicals mono-substituted with carboxy, carbo(lower)alkoxy, tetrahydropyranyloxy, hydroxy or (lower)acyloxy, the alkyl radicals containing from about 1 to about 20 carbon atoms, with alkaline hydrogen peroxide until formation of said 4,5-disubstituted-2,3-epoxycyclopentanone is substantially complete.

Seventh.—A process as sixth above defined wherein 4-(3' - hydroxyoctyl)-5-(6'-carboxyhexyl)-2,3-epoxycyclopentanone is prepared by contacting 4-(3'-hydroxyoctyl)-5-(6'-carboxyhexyl)-2-cyclopenten-1-one with alkaline hydrogen peroxide.

Eighth.—A process as sixth above defined wherein 4-(3'-tetrahydropyranyloxyoctyl)-5-(6'-carboxyhexyl)-2,3-epoxycyclopentanone is prepared by contacting 4-(3'-tetrahydropyranyloxyoctyl)-5-(6'-carboxyhexyl)-2-cyclopenten-1-one with alkaline hydrogen peroxide.

Ninth.—A process as sixth above defined wherein 4,5-dimethyl-2,3-epoxycylopentanone is prepared by contacting 4,5-dimethyl-2-cyclopenten-1-one with alkaline hydrogen peroxide.

Tenth.—A process as sixth above defined wherein is included the step of preparing said 4,5-disubstituted-2-cyclopenten-1-one compound by a process which comprises contacting a 2,3-disubstituted-levulinaldehyde of the formula:

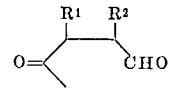

wherein $R^1$ and $R^2$ are alkyl radicals or alkyl radicals mono-substituted with carboxy, carbo(lower)alkoxy, tetrahydropyranyloxy, hydroxy or (lower)acyloxy, the alkyl radicals containing from about 1 to about 20 carbon atoms, with a base until cyclization to said 4,5-disubstituted-2-cyclopenten-1-one is substantially complete.

Eleventh.—A process as tenth above defined including the steps of separating, recovering and using as the intermediate in the subsequent steps, the said 4,5-disubstituted cyclopentene compound wherein the hydrogen atoms at the 4- and 5-positions are in the trans-stereochemical relationship, substantially free of the cis-isomer.

This embodiment provides, ultimately, pure trans-dihydro PGE₁, which is a naturally-occurring prostaglandin metabolite.

Twelfth.—A process as tenth above defined wherein 4-(3' - hydroxyoctyl)-5-(6'-carboxyhexyl)-2-cyclopenten-1-one is prepared by contacting 2-(3'-tetrahydropyranyloxyoctyl)-3-(6'-carbomethoxyhexyl)levulinaldehyde with a base, followed by acidic hydrolysis of the tetrahydropyranyloxy group.

Thirteenth.—A process as tenth above defined wherein 4 - (3'-tetrahydropyranyloxyoctyl)-5-(6'-carboxyhexyl)-2-cyclopenten-1-one is prepared by contacting 2-(3'-tetrahydropyranyloxyoctyl)3-(6'-carbomethoxyhexyl)levulinaldehyde or a 2-(3'-tetrahydropyranyloxyoctyl)-3-(6'-carboethoxyhexyl)levulinaldehyde with a base.

Fourteenth.—A process as tenth above defined wherein 4,5-dimethyl-2-cyclopenten-1-one is prepared by contacting 2,3-dimethyllevulinaldehyde with a base.

Fifteenth.—A process as thirteenth above defined including the steps of (a) Complexing hexanal with a reagent prepared by treating acetylene with ethylmagnesium bromide and decomposing the Grignard complex formed thereby to produce oct-1-yn-3-ol;

(b) Condensing the product of step (a) with dihydropyran under acidic conditions to produce 2-(oct-1-yn-3-yloxy)tetrahydropyran;

(c) Complexing the product of step (b) with ethylmagnesium bromide, reacting the complex with ethyl orthoformate and decomposing the intermediate found thereby to produce 4 - (tetrahydropyran - 2 - yloxy) - 2 - nonynal, diethyl acetal;

(d) Reacting the product of step (c) with water under acid conditions to produce 4-hydroxy-2-nonynal;

(e) Condensing the product of step (d) with dihydropyran under acid conditions to produce 4-(tetrahydropyran-2-yloxy)-2-nonynal;

(f) Hydrogenating the product of step (e) with a noble metal catalyst to produce 4-(tetrahydropyran - 2 - yloxy) nonanal;

(g) Complexing the product of step (f) with a reagent prepared by treating propyne with ethylmagnesium bromide and decomposing the Grignard complex formed thereby to produce 7 - (tetrahydropyran - 2 - yloxy) - 2-dodecyn-4-ol;

(h) Reacting t-butylacetoacetate with sodium hydride and condensing the anion formed thereby with ethyl 7-bromoheptanoate to produce 2-acetylnonadioic acid, 1-t-butyl ester, 9-ethyl ester;

(i) Esterifying the product of step (g) with methanesulfonyl chloride under basic conditions to produce 7-(tetrahydropyran-2-yloxy)-2-dodecyn-4-ol, methanesulfonate;

(j) Reacting the product of step (h) with sodium hydride and condensing the anion formed thereby with the product of step (i) to produce 2-acetyl-2-[1-(1-propynyl)-4-(tetrahydropyran - 2 - yloxy)nonyl]nonanedioic acid, 1-t-butyl ester, 9-ethyl ester;

(k) Hydrolyzing the product of step (j) under acidic conditions to produce 2-acetyl-2-[4-hydroxy - 1 - (1-propynyl)-nonyl]nonanedioic acid, 1-t-butyl ester, 9-ethyl ester;

(l) Acetylating the product of step (k) with acetic anhydride and pyridine to produce 2-acetyl-2-[4-hydroxy-1-(1-propynyl)nonyl]nonanedioic acid, 1-t-butyl ester, 9-ethyl ester, acetate;

(m) Monohydrogenating the product of step (l) with hydrogen and a palladium on calcium carbonate catalyst to produce 2-acetyl-2-[4-hydroxy - 1 - (1-propenyl)nonyl] nonanedioic acid, 1-t-butyl ester, 9-ethyl ester, acetate;

(n) Decarboxylating the product of step (m) with p-toluenesulfonic acid or with calcium iodide to produce 8-acetyl - 12 - hydroxy-9-(1-propenyl)-heptadecanoic acid, ethyl ester, acetate;

(o) Saponifying the product of step (n) with aqueous ethanolic sodium hydroxide to produce 8-acetyl-12-hydroxy-9-(1-propenyl)heptadecanoic acid;

(p) Esterifying the product of step (o) with ethereal diazomethane to produce 8-acetyl-12-hydroxy-9-(1-propenyl)heptadecanoic acid, methyl ester;

(q) Condensing the product of step (p) with dihydropyran under acidic conditions to produce 8-acetyl-12-(tetrahydropyranyl-2-oxy)-9-(1-propenyl)heptadecanoic acid, methyl ester; or (s) Decarboxylating the product of step (j) with calcium iodide to produce 8-acetyl - 12 - hydroxy-9-(1-propynyl)heptadecanoic acid, ethyl ester; and (t) Monohydrogenating the product of step (s) with hydrogen and a palladized charcoal catalyst to produce 8-acetyl-12-hydroxy-9-(1 - propenyl)heptadencanoic acid, ethyl ester; and (u) Condensing the product of step (t) with dihydropyran under acidic conditions to produce 8-acetyl-9-(1-propenyl)-12-(tetrahydropyran - 2 - yloxy)heptadecanoic acid, ethyl ester; or (v) Condensing the product of step (s) with dihydropyran under acidic conditions to produce 8-acetyl-9-(1-propynyl)-12-(tetrahydropyran - 2 - yloxy)heptadecanoic acid, ethyl ester; and (w) Monohydrogenating the product of step (v) with hydrogen and a palladized charcoal catalyst to produce 8-acetyl - 9 - (1-propenyl)-12-tetrahydropyran - 2 - yloxy) heptadecanoic acid, ethyl ester; and (r) Ozonizing the product of step (q), (u) or (w), then decomposing the ozonide produced thereby with zinc dust in acetic acid to produce 2-(3'-tetrahydropyranyloxy-octyl)-3-(6'-carbomethoxyhexyl)levulinaldehyde or 2-(3'-tetrahydropyranyloxyoctyl) - 3 - (6' - carboethoxyhexyl) levulinaldehyde.

Sixteenth.—A process for the preparation of a 4,5-disubstituted - 3 - hydroxycyclopentanone compound of the formula:

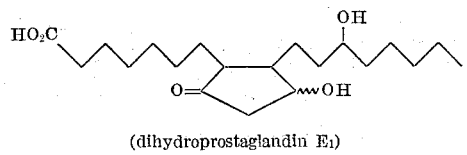

(dihydroprostaglandin E₁)

including the steps of (aa) Esterifying 4 - (3'-hydroxy-1'-octenyl)-5-(6'-carboxy-2'-hexenyl)-2-cyclopenten-1-one isolated from the Caribbean gorgonia *Plexaura homomalla* with methanesulfonyl chloride under basic conditions to produce 4-(3'-methanesulfonyloxy-1'-octenyl) - 5 - (6' - carboxy-2'-hexenyl)-2-cyclopenten-1-one;

(bb) Inverting the configuration of the oxy-substituent at the 3'-position in the compound of step (aa) by refluxing in acetone with tetraethylammonium formate to produce 4-(3'-formyloxy-1'-octenyl) - 5 - (6'-carboxy-2'-hexenyl)-2-cyclopenten-1-one;

(cc) Forming the epoxide of the compound of step (bb) and saponifying the product by reacting with alkaline hydrogen peroxide to produce 4-(3'-hydroxy-1'-octenyl)-5-(6'-carboxy-2'-hexenyl)-2,3-epoxycyclopentanone;

(dd) Hydrogenating the compound of step (cc) with hydrogen in the presence of a palladized charcoal catalyst to produce 4-(3'-hydroxyoctyl)-5-(6'-carboxyhexyl)-3-hydroxycyclopentanone.

Also contemplated by the instant invention are compounds of the formula

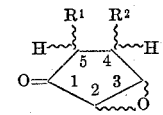

wherein $R^1$ and $R^2$ are alkyl radicals or alkyl radicals mono-substituted with carboxy, carbo(lower)alkoxy, tetrahydropyranoxy, hydroxy or lower(acyloxy), the alkyl radicals containing from about 1 to about 20 carbon atoms. These compounds are valuable intermediates in the process of this invention. Special mention is made of several important compounds within the above formula. These are:

4-(3'-hydroxyoctyl) - 5 - (6'-carboxyhexyl)-2,3-epoxycyclopentanone ($R^1$ is 6'-carboxyhexyl; $R^2$ is 3'-hydroxyoctyl).

4 - (3' - acetoxyoctyl) - 5 - (6' - carboethoxyhexyl)-2,3-epoxycyclopentanone ($R^1$ is 6'-carboethoxyhexyl; $R^2$ is 3'-acetoxyoctyl).

4 - (3' - tetrahydropyranyloxyoctyl) - 5 - (6'-carbomethoxyhexyl)-2,3-epoxycyclopentanone ($R^1$ is 6'-carbomethoxyhexyl; $R^2$ is 3'-tetrahydropyranyloxyoctyl).

4-(3'-tetrahydropyranyloxyoctyl) - 5 - (6'-carboxyhexyl)-2,3-epoxycyclopentanone ($R^1$ is 6-carboxyhexyl; $R^2$ is 3'-tetrahydropyranyloxyoctyl).

In addition there are contemplated:

4-(3' - tetrahydropyranyloxyoctyl) - 5 - (6' - carbomethoxyhexyl)-2-cyclopenten-1-one.

4-(3' - tetrahydropyranyloxyoctyl) - 5 - (6'-carboxyhexyl)-2-cyclopenten-1-one. These form a family of compounds of the formula

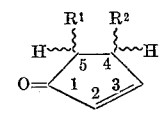

wherein $R^1$ is 6'-carbomethoxyhexyl and $R^2$ is 3'-tetrahydropyranyloxyoctyl; and $R^1$ is 6'-carboxyhexyl and $R^2$ is 3'-tetrahydropyranyloxyoctyl, respectively.

In addition there is contemplated a sub-genus of compounds of Formula I which are those of Formula Ia:

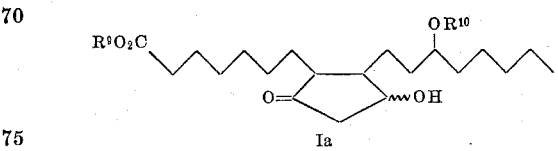

Ia wherein

R⁹ is hydrogen or (lower) alkyl (of up to about 6 carbon atoms), and

R¹⁰ is tetrahydropyanyl or acyl of from about 1 to about 20 carbon atoms.

Valuable species of Formula Ia are 4-(3'-acetoxyoctyl)-5-(6'-carboethoxyhexyl)-3-hydroxycyclopentanone, wherein R⁹ is ethyl and R¹⁰ is acetyl; and 4-(3'-tetrahydropyranyloxyoctyl)-5-(6'-carboxyhexyl)-3-hydroxycyclopentanone, wherein R⁹ is hydrogen and R¹⁰ is tetrahydropyranyl.

Furthermore, there are contemplated as valuable intermediates the following substituted levulinaldehydes:

2-(3'-hydroxyoctyl)-3-(6'-carboxyhexyl)levulinaldehyde.
2-(3'-tetrahydropyranyloxyoctyl)-3-(6'-carboxyhexyl)levulinaldehyde.
2-(3'-tetrahydropyranyloxyoctyl)-3-(6'-carbomethoxyhexyl)levulinaldehyde.
2-(3'-tetrahydropyranyloxyoctyl)-3-(6'-carboethoxyhexyl)levulinaldehyde.
2-(3'-acetoxyoctyl)-3-(6'-carboethoxyhexyl)levulinaldehyde.

These form a family of compounds of the formula

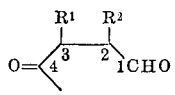

wherein

R¹ is 6'-carboxyhexyl and R² is 3'-hydroxyoctyl;
R¹ is 6'-carboxyhexyl and R² is 3'-tetrahydropyranyloxyoctyl;
R¹ is 6'-carbomethoxyhexyl and R² is 3'-tetrahydropyranyloxyoctyl;
R¹ is 6'-carboethoxyhexyl and R² is 3'-tetrahydropyranyloxyoctyl; and
R¹ is 6'-carboethoxyhexyl and R² is 3'-acetoxyoctyl, respectively.

In addition, there are contemplated as valuable intermediates the following:

8-acetyl-12-(tetrahydropyran-2-yloxy)-9-(1-propenyl)-heptadecanoic acid, methyl ester.
8-acetyl-12-hydroxy-9-(1-propenyl)heptadecanoic acid, methyl ester.
8-acetyl-12-hydroxy-9-(1-propenyl)heptadecanoic acid.
8-acetyl-12-hydroxy-9-(1-propenyl)-heptadecanoic acid, ethyl ester, acetate.
8-acetyl-12-hydroxy-9-(1-propynyl)-heptadecanoic acid, ethyl ester.
8-acetyl-12-hydroxy-9-(1-propenyl)-heptadecanoic acid, ethyl ester.
8-acetyl-9-(1-propynyl)-12-(tetrahydropyran-2-yloxy)-heptadecanoic acid, ethyl ester.
8-acetyl-9-(1-propenyl)-12-(tetrahydropyran-2-yloxy)-heptadecanoic acid, ethyl ester.
2-acetyl-2-[4-hydroxy-1-(1-propenyl)nonyl]nonanedioic acid, 1-t-butyl ester, 9-ethyl ester, acetate.
2-acetyl-2-[4-hydroxy-1-(1-propynyl)nonyl]nonanedioic acid, 1-t-butyl ester, 9-ethyl ester, acetate.
2-acetyl-2-[4-hydroxy-1-(1-propynyl)nonyl]nonanedioic acid, 1-t-butyl ester, 9-ethyl ester.
2-acetyl-2-[1-(1-propynyl)-4-(tetrahydropyran-2-yloxy)-nonyl]nonanedioic acid, 1-t-butyl ester, 9-ethyl ester.

These acetyl acids and esters comprise a family of the formula

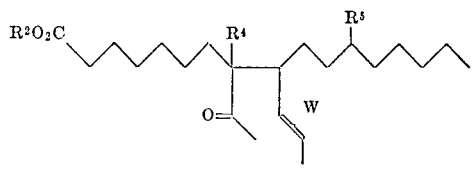

wherein

R² is methyl, R⁴ is hydrogen, R⁵ is tetrahydropyranyloxy and W is a carbon-to-carbon double bond;
R² is methyl, R⁴ is hydrogen, R⁵ is hydroxy and W is a carbon-to-carbon double bond;
R² and R⁴ are hydrogen, R⁵ is hydroxy and W is a carbon-to-carbon double bond;
R² is ethyl, R⁴ is hydrogen, R⁵ is acetoxy and W is a carbon-to-carbon double bond;
R² is ethyl, R⁴ is hydrogen, R⁵ is hydroxy and W is a carbon-to-carbon triple bond;
R² is ethyl, R⁴ is hydrogen, R⁵ is hydroxy and W is a carbon-to-carbon double bond;
R² is ethyl, R⁴ is hydrogen, R⁵ is tetrahydropyranyloxy and W is a carbon-to-carbon triple bond;
R² is ethyl, R⁴ is hydrogen, R⁵ is tetrahydropyranyloxy and W is a carbon-to-carbon double bond;
R² is ethyl, R⁴ is carbo-t-butoxy, R⁵ is acetoxy and W is a carbon-to-carbon double bond;
R² is ethyl, R⁴ is carbo-t-butoxy, R⁵ is acetoxy and W is a carbon-to-carbon triple bond;
R² is ethyl, R⁴ is carbo-t-butoxy, R⁵ is hydroxy and W is a carbon-to-carbon triple bond; or
R² is ethyl, R⁴ is carbo-t-butoxy, R⁵ is tetrahydropyranyloxy and W is a carbon-to-carbon triple bond.

Also contemplated as an intermediate is:

2-acetylnonadioic acid, 1-t-butyl ester, 9-ethyl ester.

Also contemplated as intermediates are:

7-(tetrahydropyran-2-yloxy)-2-dodecyn-4-ol, methanesulfonate.
7-(tetrahydropyran-2-yloxy)-2-dodecyn-4-ol.

These form a family of the formula

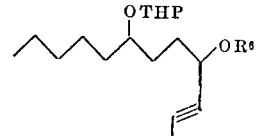

wherein THP is tetrahydropyranyl and wherein R⁶ is methanesulfonyl or hydrogen.

In addition as valuable intermediates there are contemplated:

4-(tetrahydropyran-2-yloxy)nonanal.
4-(tetrahydropyran-2-yloxy)-2-nonynal.
4-hydroxy-2-nonynal.
4-(tetrahydropyran-2-yloxy)-2-nonynal, diethyl acetal.

These nonanal derivatives comprise a family of the formula

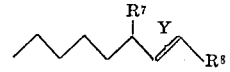

wherein R⁷ is tetrahydropyranyloxy, R⁸ is CHO and Y is a carbon-to-carbon single bond; R⁷ is tetrahydropyranyloxy, R⁸ is CHO and Y is a carbon-to-carbon triple bond; R⁷ is hydroxy, R⁸ is CHO and Y is a carbon-to-carbon triple bond; or R⁷ is tetrahydropyranyloxy, R⁸ is $CH(OCH_2CH_3)_2$ and Y is a carbon-to-carbon triple bond.

Also as valuable intermediates there are contemplated:

4-(3'-methanesulfonyloxy-1'-octenyl)-5-(6'-carboxy-2-hexenyl)-2-cyclopenten-1-one.
4-(3'-formyloxy-1'-octenyl)-5-(6'-carboxy-2'-hexenyl)-2-cyclopenten-1-one.
4-(3'-hydroxy-1'-octenyl)-5-(6'-carboxy-2'-hexenyl)-2,3-epoxycyclopentanone.

When used herein and in the appended claim, the term "alkyl" contemplates hydrocarbon radicals, straight and branched chain, containing from about 1 to about 20 carbon atoms, and includes methyl, ethyl, n-propyl, i-propyl, n-butyl, t-butyl, n-pentyl, 3-methylpentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nondecyl, n-eicosyl and the like. The term carbo(lower)alkoxy refers to carboxyl groups of the formula —$CO_2R^3$ wherein $R^3$ is (lower) alkyl of from about 1 to about 6 carbon atoms, as illustrated above including up to n-hexyl. The term "(lower) acyloxy" contemplates an organic radical derived from an organic acid containing up to about 7 carbon atoms by removal of the hydroxyl group and is illustrated by formyloxy, acetoxy, propionyloxy, n-butyroyloxy, sec-butyroyloxy, n-pentanoyloxy, n-hexanoyloxy, cyclopentanoyloxy, benzoyloxy, and the like.

The process of the present invention in its first fourteen above mentioned embodiments may be represented as follows:

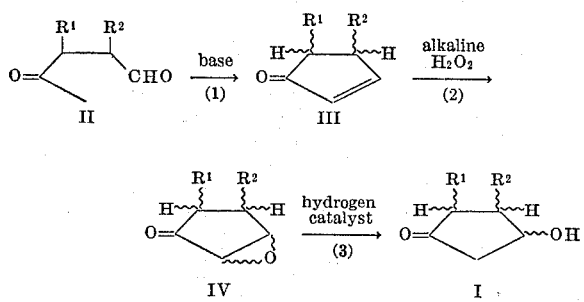

wherein $R^1$ and $R^2$ are as hereinabove defined.

The first step (1) involves the conversion of the levulinaldehyde (II) with base, e.g., an alkali metal or alkaline earth metal hydroxide, carbonate or obvious chemical equivalent thereof, preferably sodium hydroxide, under cyclizing conditions into the 2-cyclopenten-1-one (III). In one manner of proceeding a solution or suspension of the aldehyde (II) in about 200 parts by weight of water is treated with about 1/10 of its total volume of 5 N sodium hydroxide solution at a temperature of from about 0° C. to about 50° C., preferably from about 20° C. to about 30° C. until cyclization to the corresponding 2-cyclopentan-1-one is substantially complete. The time required will vary from about 5 minutes to about 2 to 3 hours, but in most cases, at about 25° C., 15 minutes is sufficient. The intermediate of Formula III can be recovered by any conventional means. One convenient procedure is to extract the reaction mixture with a water-immiscible organic solvent, such as ether, ethyl acetate, methylene chloride, and the like, then to wash and dry and finally to distill the solvent off of the intermediate. The intermediate of Formula III can be purified, if desired, by distillation in a vacuum or by recrystallization.

Nuclear magnetic resonance studies indicate the product of step (1) to consist mainly of the 4,5-trans-disubstituted ketone (IIIa)

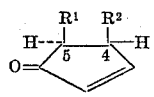

The 4,5-cis-disubstituted ketone is depicted by Formula IIIb:

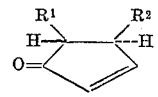

In the case where $R^1=R^2$=methyl, the NMR spectrum of IIIa exhibits a multiplet for the C–5 proton with coupling constants of 7.5 and 2.5 cps., which arise from the coupling with the C–5 methyl protons and the C–4 proton, respectively. The 2.5 cps. coupling constant of the C–4 and C–5 protons is indicative of a dihedral angle of 120° which is consistent with the trans configuration for these protons. Accordingly, it may be assumed that the products of the instant process possess mainly the 4,5-trans-configuration corresponding to the configuration of the natural prostaglandin series. In one embodiment of this invention, the trans isomer (IIIa) is separated from the cis isomer (IIIb) to provide (after using IIIa in steps (2) and (3)) a product containing the totally synthetic prostaglandin of the natural configuration. The separation of isomers is accomplished by any conventional means used in this series, for example, chromatography, gas liquid chromatography, countercurrent distribution and obviously equivalent means can be used.

The second step (2) involves the treatment of the 4,5-disubstituted-2-cyclopenten-1-one of Formula III with alkaline hydrogen peroxide to form the corresponding 4,5-disubstituted-2,3-epoxycyclopentanone of Formula IV. The conditions for this conversion involve carrying out the reaction in an alkaline medium (aqueous alkali metal or alkaline earth metal hydroxioides, carbonates, or obvious chemical equivalents thereof) preferably an aqueous sodium hydroxide medium with hydrogen peroxide of moderate concentrations, e.g., 15 to 50%, preferably about 30%, being mixed with the 2-cyclopenten-1-one before adding the alkali. The reaction preferably is conducted at low temperatures, between about the freezing point of the mixture and about 35° C. In one manner of proceeding, a solution of 10% sodium hydroxide is added to an ice cold mixture comprising the cyclopenten-1-one of Formula III and about 3 parts by weight of 30% hydrogen peroxide, based on the weight of the cyclopenten-1-one. The reaction is substantially complete after about 20 minutes at 0° C. The intermediate 4,5-disubstituted-2,3-epoxycyclopentanone of Formula IV is recovered by any conventional means. One convenient technique comprises adding about 3 volumes of water to the reaction mixture, extracting the diluted mixture with a water-immiscible organic solvent, such as ether, ethyl acetate, methylene chloride and the like, washing and drying the extract and removing the solvent by distillation, leaving the compound of Formula IV as a residue.

The third step (3) involves hydrogenolysis of the 4,5-disubstituted-2,3-epoxycyclopentanone by reaction with hydrogen over a catalyst, such as a noble metal catalyst, finely divided or supported, on a carrier, for example, platinum or palladium, or palladium on carbon or palladium on charcoal (which is preferred) until formation of the 4,5-disubstituted-3-hydroxycyclopentanone is substantially complete. In one manner of proceeding, the 4,5-dialkyl-2,3-epoxycyclopentanone in about 4 volumes of a solvent, such as methanol, is mixed with palladized charcoal, then reacted with hydrogen at a temperature from about 5° C. to about 50° C., preferably at about 25° C. at low to moderate pressures, e.g., from about 1 to about 3 atmospheres, preferably about 1 atmosphere until absorption of the equivalent amount or a slight excess, e.g., up to about 1.1 moles of hydrogen is substantially complete. The instant products of Formula I are recovered by any conventional technique. One convenient means comprises filtering the reaction mixture and distilling off the solvent to leave the product as a residue. It may be purified by distillation in a vacuum or by crystallization from an appropriate solvent such as a lower alkanol, e.g., methanol or a lower ketone, or a lower ester, such as ethyl acetate.

Even where the products of Formula I are prepared without separation of the precursor products of Formula III into their trans and cis-isomers IIIa and IIIb, respectively, the aforesaid products still consist mainly of the isomer in which the hydrogens at the 4 and 5-positions are in the trans-configuration. This is shown for the case in which $R^1=R^2=$methyl by the transformation of the mixture of 4,5-dimethyl-3-hydroxycyclopentanones by base to a mixture containing the cyclopentenones IIIa and IIIb in a ratio of 7:1. This mixture was separated by preparative gas liquid chromatography into its two components and proton NMR spectroscopy was used to confirm the structures assigned to them. For example, the spectrum of compound IIIb in which $R^1=R^2=$methyl displayed a quintet for the C-5 poroton with a 7.2 cps. coupling constant. This pattern arises from overlapping quartets resulting from coupling with the C-5 methyl protons and the C-4 proton. The 7.2 cps. coupling constant for the C-4 and C-5 protons is indicative of a dihedral angle of 0° which reveals the cis-configurational relationship for these protons.

The process of this invention represented by the fifteenth above-metioned embodiment may be represented in the following pathway:

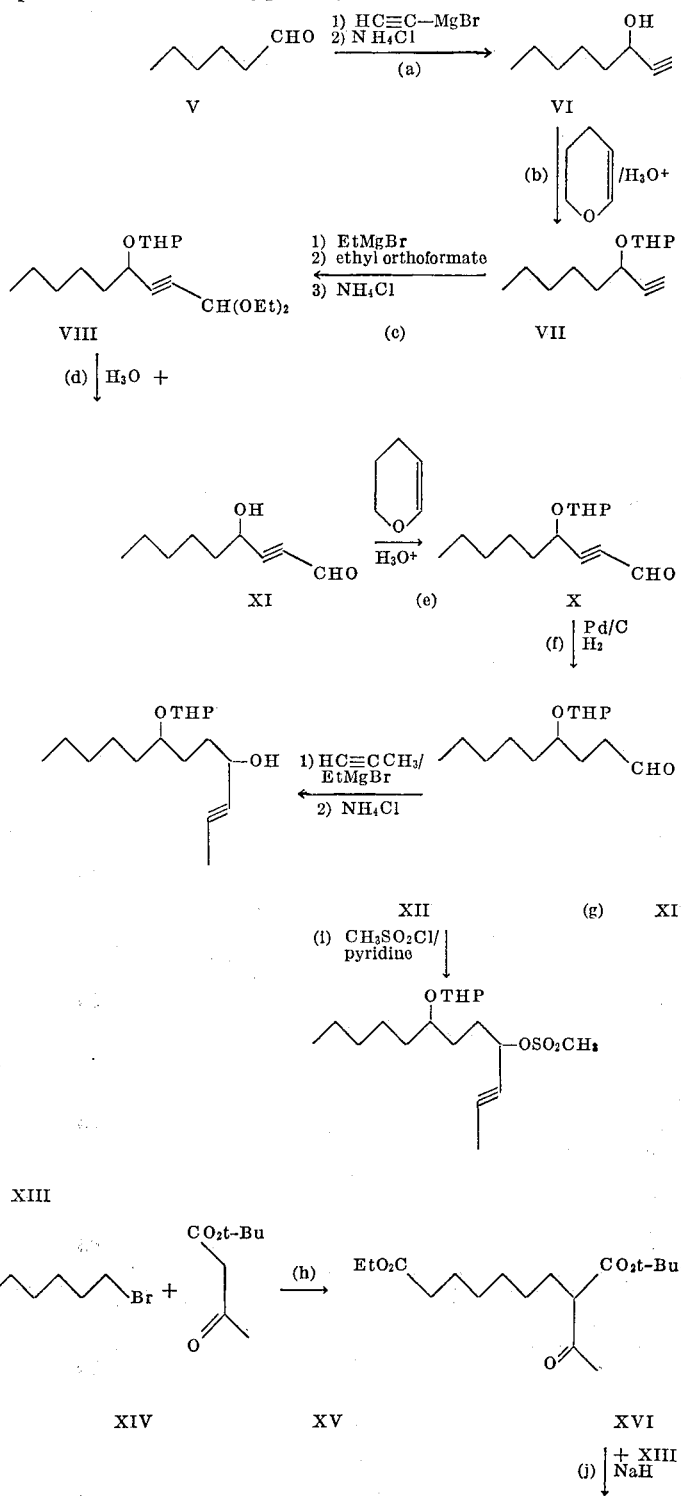

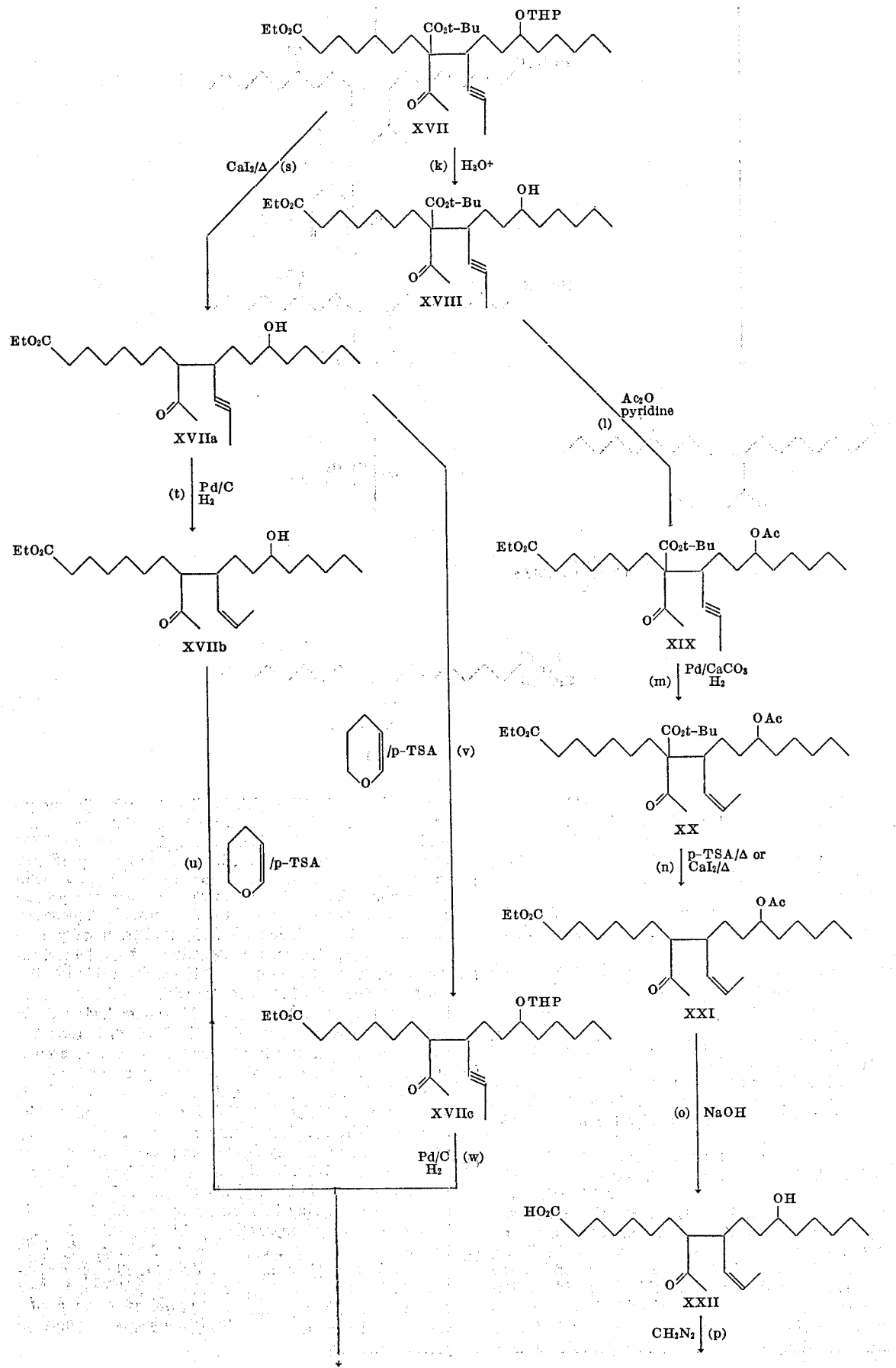

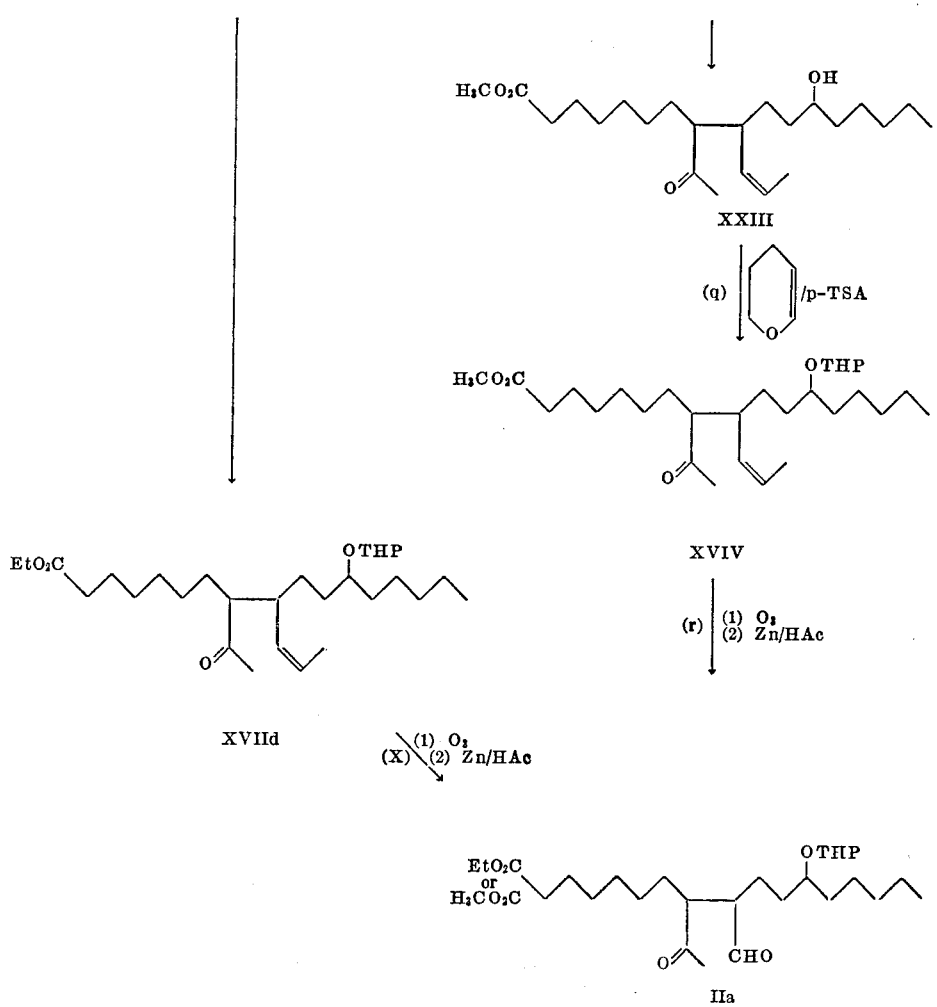

wherein "THP" is tetrahydropyranyl, "p-TSA" is p-toluenesulfonic acid, "Ac₂O" is acetic anhydride and "HAc" is acetic acid. The reagents are illustrative, but are not limiting. As will be obvious to those skilled in the art, equivalents will be available to accomplish the stated conversion step.

As is mentioned hereinabove, compounds IIa, VII-XIII and XVI-XXIV are within the purview of this invention.

The procedures for carrying out the fifteenth embodiment are exemplified in detail hereinafter. Generally, treatment of hexanal (V) with ethynylmagnesium halide to obtain the alcohol (VI) and the preparation of its THP ether (VII) is accomplished essentially as reported in J. Med. Chem., 8, 41 (1965). Subjecting the Grignard derivative of VII to ethyl orthoformate and decomposing with ammonium chloride affords the acetal (VIII). Acid hydrolysis of the acetal provides the hydroxyaldehyde (IX) which will decompose on distillation. However, the rather impure IX can be converted to its THP ether (X), which distills with much less decomposition. Hydrogenation of X, e.g., with 10% Pd/C in ethyl acetate, yields a stable aldehyde (XI). Treating (XI) with propynyl magnesium halide and decomposing the complex, e.g., with ammonium chloride, provides a distillable, viscous alcohol (XII), which can be transformed into the mesylate (XIII) with mesyl chloride in pyridine. The mesylate is very unstable and preferably is used immediately in step (j). The ethyl 7-bromoheptanoate (XIV) alkylation of t-butylacetoacetate (XV) provides a non- adioic diester (XVI) which is alkylated with the mesylate (XIII), e.g., in the presence of an alkali metal hydride, e.g., sodium hydride. Acid hydrolysis of the THP ether (XVII) followed, e.g., by chromatography, affords the alcohol (XVIII). Acetylation of (XVIII), e.g. with acetic anhydride preferably in the presence of pyridine provides the acetate (XIX), which is monohydrogenated, e.g., with a 2% palladium/CaCO₃ catalyst in ethyl acetate, to produce the propene derivative (XX). Decarboxylation of XX to the di-ester (XXI) can be achieved with either p-TSA/110° C./0.5 hr. or with CaI₂/150° C./1.5 hr. Hydrolysis of XXI with 0.5 N sodium hydroxide in 50% aqueous ethanol provides XXII which is esterified with diazomethane in ether to produce XXIII. Treatment of XXIII in benzene with dihydropyran and p-TSA affords XXIV. Alternatively, decarboxylation of XVII is achieved with CaI₂/150° C./25 min., to produce the alcohol (XVII-a). Monohydrogenation of XVII-a, e.g. with 10% Pd/c in ethyl acetate to produce the propene derivative (XVII-b). Treatment of XVII-b with dihydropyran and p-TSA in benzene affords XXIV. The final two alternative steps may be reversed by treating XVII-a in benzene with dihydropyran and p-TSA to produce XVII-c followed by monohydrogenation of XVII-c, e.g. with 10% Pd/c in ethyl acetate to produce the propene derivative (XVII-d). Ozonolysis of XVII-d, followed by Zn/HAc work-up gives the desired aldehyde IIa which is converted by the embodiments described above to dihydroprostaglandin E₁.

The process of this invention represented by the sixteenth above-mentioned embodiment may be represented by the following pathway:

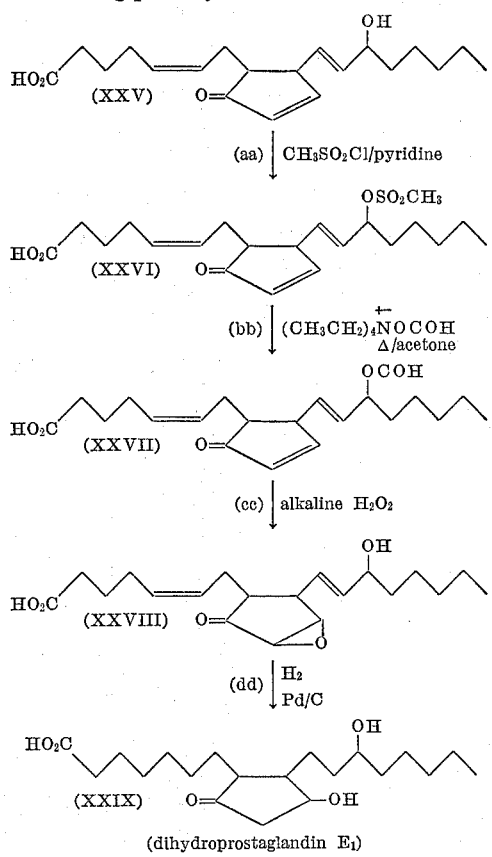

(dihydroprostaglandin E₁)

Use of the processes of the invention will also lead to compounds having prostaglandin-like activity when applied to substances derived from naturally occurring cyclopentanones such as 4-(3'-hydroxy-1'-octenyl)-5-(6'-carboxy-2'-hexenyl)-2-cyclopenten-1-one (XXV) which has recently been isolated (along with its acetate) from the Caribbean gorgonia Plexaura homomalla (A. J. Weinheimer and R. L. Spraggins, Paper 41, Division of Medicinal Chemistry, Abstracts of Papers, 158th National Meeting of American Chemical Society, September 7–12, 1969, Craftsman Press, Inc., Bladensburg, Md.

Thus XXV, isolated directly from natural sources or through saponification of the naturally occurring acetate, is converted with methanesulfonyl chloride in pyridine to its mesylate XXVI, which is refluxed in acetone with tetraethylammonium formate, a procedure previously used to invert the configuration of hydroxyl groups [S. G. Levine, N. H. Eudy and C. F. Leffler, J. Org. Chem., 31, 3995 (1966); L. F. Fieser and M. Fieser, "Reagents for Organic Synthesis," John Wiley and Sons, Inc., New York, 1967, p. 1136]. The formate product XXVII treated with alkaline hydrogen peroxide gives the epoxide XVIII (epoxidation being accompanied by saponification), and the latter, on hydrogenation over a palladium catalyst is converted to an alcohol product XXIX containing dihydroprostaglandin E₁.

As has been mentioned hereinabove, the compounds prepared by the instant process have valuable pharmacodynamic properties. Notably, a large group of naturally occurring, biologically active prostaglandins and prostaglandin metabolites fall within the scope of Formula I. Thus, dihydro PGE₁, which possesses potent blood pressure lowering and bronchodilator properties is a compound of Formula I wherein $R^2$ is 3'-hydroxyoctyl and $R^1$ is 6'-carboxyhexyl, in a trans relationship. This makes them useful in the control of hypertension and bronchoconstriction in valuable domestic animals and in laboratory animals such as mice, rats and rabbits. Furthermore, as also is mentioned above, the ureide of dihydro PGE₁ and the thiosemicarbazone of dihydro PGE₁ are surprisingly effective as bronchodilators, which makes them useful to treat experimentally-induced respiratory disorders in warm blooded lower animals, such as guinea pigs.

By way of illustration, for the purposes mentioned above, the bis-p-dimethylaminophenyl ureide of dihydro PGE₁ (also known as 1,3-bis(p-dimethylaminophenyl)-1-[[7-[3-hydroxy-2-(3-hydroxyoctyl) - 5 - oxocyclopentyl]-5-heptanoyl]]urea) can be administered in a variety of dosage forms, the oral route being used primarily for maintenance therapy while injectables tend to be useful in acute emergency situations. Inhalation (aerosols and solution for nebulizers) seems to be somewhat faster acting than other oral forms but slower than injectables and this method combines the advantages of maintenance and moderately acute stage therapy in one dosage unit.

As is disclosed in Ser. No. 672,728 filed Oct. 4, 1967, the daily dose requirements vary with the particular composition being employed and severity of the symptoms being presented. The dosage varies with the size of the patient. With large animals, e.g., about 70 kilograms average body weight, by the oral inhalation route, with, for example, a hand nebulizer or a pressurized aerosol dispenser, the ordinarily effective dose is from about 50 milligrams to about 150 milligrams of the instant compounds every four hours, as needed. By the oral ingestion route, preferably sublingually, the effective dose is from about 250 to about 1000 mg., preferably from about 500 to about 750 mg., up to a total of about 3000 mg. per day. By the intravenous route, the ordinarily effective dose is from about 50 milligrams to about 250 milligrams, preferably about 175 milligrams per day.

For dosage units, the said prostaglandin ureide compound can be compounded into any of the usual oral dosage forms including tablets, capsules and liquid preparations such as elixirs and suspensions containing various coloring, flavoring, stabilizing and flavor masking substances. For compounding oral dosage forms the active ingredient can be diluted with various tableting materials such as starches of various types, calcium carbonate, lactose, sucrose and dicalcium phosphate to simplify the tableting and capsulating process. A minor proportion of magnesium stearate is useful as a lubricant.

For administrattion by the oral inhalation route with conventional nebulizers or by oxygen aerosolization it is convenient to provide the said prostaglandin ureide compound in dilute aqueous solution or suspension preferably at concentrations of about 1 part of medicament to from about 100 to 200 parts by weight of total preparation. Entirely conventional additives may be employed to stabilize these preparations or to provide isotonic media, for example, sodium chloride, sodium citrate, citric acid, sodium bisufite, and the like may be used.

For administration as a self-propelled dosage unit for administering the medicament in aerosol form suitable for inhalation therapy, the compounds can be used in compositions comprising the medicament suspended in an inert propellant (such as a mixture of dichlorodifluoromethane and dichlorotetrafluoroethane) together with a co-solvent, such as ethanol, flavoring materials and stabilizers. Instead of a co-solvent there can also be used a dispensing agent such as oleyl alcohol. Suitable means to employ the aerosol inhalation therapy technique are described fully in U.S. 2,868,691 and 3,095,355.

The following procedures illustrate useful means to obtain starting materials employed in the instant process.

PROCEDURE A 2,3-dimethyllevulinaldehyde (a) 2-methyl-2-(1-methyl-2 - butenyl)acetoacetic acid, ethyl ester.—Add a mixture of 100 g. of 2-penten-4-ol and 25 ml. of pyridine dropwise over ½ hour to 115 g. of phosphorus tribromide cooled in an ice bath. After stirring for 1 hour at room temperature, the mixture is distilled to obtain 135 g. of 4-bromo-2-pentene, B.P. 22–38°/12 mm.

Add ethyl α-methylacetoacetate (120 ml.) dropwise to an ice-cooled mixture of 40 g. of 50% sodium hydride-oil dispersion in 500 ml. benzene and 300 ml. dimethylformamide with stirring under nitrogen. Stir at room temperature for 15 min., add 135 g. of the above 4-bromo-2-pentene dropwise and reflux the resulting suspension for 1 hour. Add the cooled mixture to water and extract with ether. Evaporate the washed and dried extract and distill the residue to obtain 121 g. of the product, B.P. 97–100°/3 mm., $$\lambda_{max.}^{film} \; 5.8\mu$$

Found: C, 67.58; H, 9.26. Calcd. for $C_{12}H_{20}O_3$: C, 67.89; H, 9.50.

(b) 3,4-dimethyl-5-hepten-2-one.—Stir and reflux a mixture of 62.6 g. of 2-methyl-2-(1-methyl-2-butenyl) acetoacetic acid, ethyl ester and 200 g. of barium hydroxide in 1.5 liters of water for 2 days. Acidify the cooled mixture with concentrated hydrochloric acid and extract with ether. Distill the washed and dried extract to obtain 35.3 g. of the product, B.P. 73–77°/20 mm., $$\lambda_{max.}^{film} \; 5.85\mu$$

Found: C, 77.38; H, 11.55. Calcd. for $C_9H_{16}O$: C, 77.09; H, 11.50.

(c) 2,3-dimethyl levulinaldehyde. — Cool a mixture of 10 g. of 3,4 - dimethyl - 5 - hepten - 2 - one, 5.5 ml. of pyridine and 200 ml. methylene chloride in a Dry Ice-acetone bath and ozonize ($O_2$ 8 p.s.i., 110 volts, flow rate .04) for 70 min. Add the cold solution to 6.0 g. of zinc dust, stir and treat with 13 ml. of acetic acid. Stir the mixture at room temperature by cooling with an ice bath when necessary, for 2 hours. Treat the mixture with aqueous $Na_2CO_3$ until basic, adjust to pH 5 with hydrochloric acid, separate and extract with additional methylene chloride. Evaporate the washed and dried extract and distil the liquid to obtain 5.7 g. of 2,3-dimethyllevulinaldehyde B.P. 60–62°/2.5 mm., $$\lambda_{max.}^{film} \; 5.80\mu$$

Reported B.P. 76–79°/12.5 mm. in Helv. Chim. Acta 42, 2746 (1959).

DESCRIPTION OF THE PREFERRED EMBODIMENTS

The following examples illustrate the use of the processes of this invention to prepare a number of valuable compounds. The examples are merely illustrative and are not to be construed to limit the scope of the invention in any manner whatsoever.

Example 1.—2-(3'-hydroxyoctyl)-3-(6'-carboxyhexyl)-levulinaldehyde and tetrahydropyranyl ether thereof The process of Procedure A is repeated substituting stoichiometrically-equivalent amounts of ethyl α-(6-carboethoxyhexyl)acetoacetate and 6,14 - di - tetrahydropyranyloxy-11-methanesulfonyloxy - 9 - nonadecene as starting materials in step (a). The product of step (c) is suspended in aqueous methanol containing about 5% by weight of hydrogen chloride and warmed to 50° C. for 1 hour. Evaporation of the solvent leaves the title product as a residue.

Example 2.—2 - (3'-tetrahydropyranyloxyoctyl)-3-6'-carbomethoxyhexyl)levulianaldehyde and 2 - (3' - tetrahydropyranyloxyoctyl) - 3-(6'-carboethoxyhexyl)levulinaldehyde (a) Oct-1-yn-3-ol.—Acetylene is passed through 2 solid $CO_2$-acetone traps and bubbled through 1 liter of tetrahydrofuran (THF) for 10 minutes. With acetylene bubbling through the solution, 335 ml. of 3 M EtMgBr-$Et_2O$ is added with stirring in small portions over 1 hour. The reaction mixture foams and refluxes slowly during addition of the Grignard reagent. The resulting brown suspension is saturated with acetylene for another 10 minutes, cooled to 5° C., acetylene is discontinued and the mixture is cooled to —5° C. with a MeOH-ice bath. Freshly distilled hexanal (100 g.) is added dropwise to the stirred mixture over 1.25 hr. while keeping the temperature at 0° C. The suspension is stirred at 0° C. for 1 hour, stirred at room temperature for 16 hours, added to 3 liters of saturated $NH_4Cl$ and extracted with ether. After washing with water, the ether solution is dried, evaporated and the residue distilled to give 47 g. of oct-1-yn-3-ol, B.P. 85–90° C./1.5 mm. (reported B.P. 75–85° C./10 mm., J. Med. Chem. 8, 41 [1965]), $$\lambda_{max.}^{film} \; 3.1\mu \; (s) \; (\text{hydroxyl and ethynyl C—H})$$

NMR: 4.39 (multiplet, C–3 H), 3.41 (s, hydroxyl H), 2.47 (d, J=2 cps., C–1 H) p.p.m.

(b) 2-(oct-1-yn-3-yloxy)tetrahydropyran.—A mixture of 195 g. of oct-1-yn-3-ol and 153 g. of dihydropyran (purified by standing over KOH pellets for 2 days and distilling from $CaH_2$) is stirred and cooled to 10° C., treated with 6 drops of conc. HCl, stirred at 10° C. for ½ hr. and kept at room temperature for 3 days (only 1 day necessary). The mixture is treated with 3 pellets of KOH and distilled to obtain 279.4 g. of 2-(oct-1-yn-3-yloxy)tetrahydropyran, B.P. 70–88° C./0.3 mm. [reported B.P. 74° C./0.5 mm., J. Med. Chem. 8, 41 (1965)], $$\lambda_{max.}^{film} \; 3.1\mu \; (w) \; (\text{ethynyl C—H})$$

NMR: 2.42 (quartet, ethynyl H) p.p.m.

(c) 4 - (tetrahydropyran - 2 -yloxy)-2-nonynal, diethyl acetal.—A solution of 192.2 g. of 2-(oct-1-yn-3-yloxy) tetrahydropyran in 250 ml. of ether is added dropwise under nitrogen during ¾ hour to 410 ml. of 3 M EtMgBr-ether with stirring. After refluxing for ½ hour, 177 g. of ethyl orthoformate is added and the mixture refluxed for 18 hours. The resulting suspension is added to 2 liters of saturated $NH_4Cl$ and extracted with ether. After washing with water, the ether extract is dried, evaporated and the residue distilled to obtain 219.8 g. of product, B.P., 140–160° C./0.2 mm. An analytical sample exhibits B.P. 143° C./0.15 mm., $$\lambda_{max.}^{film} \; 3.50, \; 7.55, \; 8.94, \; 9.50, \; 9.80\mu$$

NMR: 5.32 (s, C–1 H), 1.25 (t, J=7 cps., ethyl $CH_3$).

*Analysis.*—Found (percent): C, 69.19; H, 10.11. $C_{18}H_{32}O_4$ requires (percent): C, 69.19; H, 10.32.

(d) 4-hydroxy-2-nonynal.—A solution of 216.8 g. of 4-(tetrahydropyran-2-yloxy)-2-nonynal, diethyl acetal in 1.1 liters of THF is treated with 210 ml. of 30% $H_2SO_4$ and the mixture stirred at 25° C. for 5.5 hr. The mixture is diluted with 4 liters of water and extracted with ether. After washing with 5% $KHCO_3$ and water, the ether extract is dried and evaporated to yield 169.1 g. of 4-hydroxy-2-nonynal, $$\lambda_{max.}^{film} \; 3.0 \; (M) \; (\text{hydroxyl}), \; 4.5 \; (w) \; (C=C), \; 5.93 \; (s) \; (\text{aldehyde carbonyl}) \; \mu$$

(e) 4 - (tetrahydropyran - 2 - yloxy) - 2 - nonynal.—A stirred mixture of 169 g. of 4-hydroxy-2-nonynal and 127 g. of dihydropyran is treated with 12 drops of concentrated HCl and the reaction temperature maintained for ½ hour at 20–25° C. with an ice bath. After stirring at room temperature for 4 hours, the mixture is diluted with 1 liter of ether, washed with 5% $KHCO_3$, water and dried. Evaporation and distillation of the residue affords 114.5 g. of 4-(tetrahydropyran-2-yloxy)-2-nonynal B.P., 100–120° C./0.2 mm., $$\lambda_{max.}^{film} \; 4.53 \; (M) \; (C \equiv C), \; 5.95 \; (s) \; (\text{aldehyde carbonyl}) \; \mu$$

(f) 4-(tetrahydropyran-2-yloxy)nonanal.—A solution of 22.9 g. of 4-(tetrahydropyran-2-yloxy)-2-nonylan in 75 ml. of ethyl acetate is added to 4.5 g. of 10% Pd/C prehydrogenated in 100 ml. of ethyl acetate and the mixture is hydrogenated at 25° C. and atmospheric pressure. When 2.1 equivalents of hydrogen are absorbed, the reaction mixture is filtered, evaporated and distilled to give 14.7 g. of 4-(tetrahydropyran-2-yloxy)-nonanal. The analytical sample exhibits B.P. 100–102° C./0.05 mm., $\lambda_{max.}^{film}$ 3.75 (w) (aldehyde hydrogen), 5.80 (s) (aldehyde carbonyl) $\mu$ NMR: 9.83 (multiplet, aldehyde H), 4.63 (broad singlet) and 3.68 (3 proton multiplet, O—C—H protons), 2.57 diffuse quartet, J=7 cps., C–$\mu$ protons) p.p.m.

Analysis.—Found (percent): C, 69.31; H, 10.80. $C_{14}H_{26}O_3$ requires: (percent) C, 69.38; H, 10.81.

(g) 7 - (tetrahydropyran-2-yloxy)-2-dodecyn-4-ol.—A solution of 60 g. of propyne in 800 ml. of THF is added dropwise over 1 hr. to 168 ml. of 3 M EtMgBr/ether with stirring under nitrogen. After bubbling propyne through the reaction mixture for 15 min., the mixture is cooled to —5° C. with methanol-ice and 82.2 g. of 4-(tetrahydropyran-2-yloxy)nonanal and 150 ml. of THF is added dropwise over ½ hour while maintaining the temperature at 0° F. After stirring at 0° C. for ½ hour and at 25° C. for 2 hours, the mixture is added to 3 liters of saturated $NH_4Cl$ solution and extracted with ether. The extract is washed with water, dried, evaporated and distilled to obtain 76.3 g. of product (a viscous oil) B.P. 130–145° C./0.05 mm., $\lambda_{max.}^{film}$ 3.00 (M) (hydroxyl) $\mu$ NMR: 1.72 (broad singlet, propynyl methyl) p.p.m.

Analysis.—Found (percent): C, 72.02; H, 10.91. $C_{17}H_{30}O_3$ requires (percent): C, 72.30; H, 10.71.

(h) 2 - acetylnonadioic acid, 1 - t - butyl ester, 9-ethyl ester.—t-Butyl acetoacetate (14.6 g.) is added dropwise over ½ hour to a stirred mixture of 4.0 g. of 50% NaH-mineral oil in 20 ml. of dimethyl formamide and 40 ml. of benzene under nitrogen. After stirring at 25° C. for 1 hour, 10.0 g. of ethyl 7-bromoheptanoate is added and the mixture is refluxed for ½ hour, then diluted with water and extracted with ether. After washing with 5% NaOH and water, the extract is dried, evaporated and the residue chromatographed or silica. Elution with 1:19 ether-benzene affords 14.2 g. of product, $\lambda_{max.}^{film}$ 5.80 (s) (carbonyls) $\mu$ NMR: 4.14 (quartet, J 7 cps., ethyl $CH_2$), 3.32 (triplet, J 7 cps., C-2 H), 2.28 (multiple, C-8 protons), 2.20 (singlet, acetyl methyl), 1.47 (singlet, t-butyl protons), 1.25 (triplet, J 7 cps., ethyl $CH_3$) p.p.m.

Analysis.—Found (percent): C, 64.98; H, 9.33. $C_{17}H_{30}O_5$ requires (percent): C, 64.94; H, 9.62.

(i) 7 - (tetrahydropyran-2-yloxy) - 2 - dodecyn - 4-ol, methanesulfonate.—An ice-cooled mixture of 19.9 g. of 7 - (tetrahydropyran-2-yloxy)-2-dodecyn-4-ol and 8.0 ml. of pyridine is treated with 6.0 ml. of methanesulfonyl chloride and stirred for 15 minutes. The resulting viscous suspension is kept at 0° C. for 12 hours, diluted with ether and filtered. The ether solution is washed thrice with water, once with brine, filtered through $Na_2SO_4$ and dried over $MgSO_4$ for 2 hours. After filtration and evaporating of the ether at 30° C./20 mm., the residue is stirred under 0.005 mm. pressure at 25° C. for 2 hours to give 23.2 g. of crude 7-(tetrahydropyran-2-yloxy)-2-dodecyn - 4 - ol, methanesulfonate, $\lambda_{max.}^{film}$ 4.50 (w) (C≡C), 7.35 and 8.50 (s) (mesylate)

NMR: 5.22 (broad multiplet, C-4 H), 3.11 (s, mesylate $CH_3$), 1.92 (doublet, propynyl $CH_3$) p.p.m. Since the mesylate decomposes to a black tar after 16 hours at 25° C., the crude product is immediately used in the next step.

(j) 2-acetyl-2-[1-(1-propynyl) - 4 - (tetrahydropyran-2-yloxy)nonyl]nonanedioic acid, 1 - t - butyl, 9 - ethyl ester.—To a stirred mixture of 3.02 g. of 50% NaH-oil in 6 ml. of benzene and 30 ml. DMF under nitrogen, 19.8 g. of 2-acetyl-1,9-nonadioic acid, 1-t-butyl ester, 9-ethyl ester is added dropwise over 15 minutes. After stirring at 25° C. for ½ hour, 22.95 g. of the mesylate of step (i) is added and the mixture is refluxed for ½ hour. The cooled reaction mixture is diluted with water, extracted with ether and the extract washed with water, dried, and evaporated. Chromatography of the residue on alumina (Activity 3, neutral) and elution with benzene affords 22.3 g. of product, a viscous oil, $\lambda_{max.}^{film}$ 5.80 (s) (carbonyl) $\mu$ NMR: 4.68 (broad multiplet, O—CH—O), 4.13 (quartet, J=7 cps., ethyl $CH_2$), 2.25 (multiplet, C-2 protons and acetyl $CH_3$), 1.77 and 1.80 (propynyl $CH_3$), 1.48 (s, t-butyl protons), 1.25 (t, J=7 cps., ethyl $CH_3$) p.p.m.

Analysis.—Found (percent): C, 70.12; H, 10.04. $C_{34}H_{58}O_7$ requires (percent): C, 70.55; H, 10.10.

(k) 2-acetyl-2-[4-hydroxy - 1 - (1 - propynyl)-nonyl]-nonanedioic acid, 1-t-butyl, 9-ethyl ester.—A solution of 20.2 g. of 2-acetyl-2-[1-(1-propynyl) - 4 - (tetrahydropyran-2-yloxy)nonyl]nonanedioic acid, 1-tert-butyl-9-ethyl ester in 200 ml. of THF is treated with 70 ml. of 6 N HCl and the 2 phase mixture is stirred for 1 hour while maintaining the temperature at 25° C. with an ice-bath as necessary. The mixture is diluted with water, extracted with ether and the extract washed with 5% $KHCO_3$, water and dried. Evaporation and chromatography of the residue on alumina (neutral, Activity 3) followed by elution with 1:19 ether-benzene affords 10.9 g. of product, a viscous oil, $\lambda_{max.}^{film}$ 2.90 (M) (hydroxyl), 5.80 (s) (carbonyl)

NMR: 4.13 (q, J=7 cps., ethyl $CH_2$), 3.66 (broad multiplet, C–12 H), 2.95 (broad multiplet, C–9 H), 2.30 (multiplet, C–2 protons), 2.20 and 2.23 (acetyl $CH_3$), 1.78 and 1.81 (propynyl $CH_3$), 1.48 (s, t-butyl protons), 1.25 (t, J=7 cps., ethyl $CH_3$) p.p.m.

Analysis.—Found (percent): C, 70.30; H, 10.00. $C_{29}H_{50}O_6$ requires (percent): C, 70.41; H, 10.19.

(l) 2-acetyl-2-[4-hydroxy - 1 - (1 - propynyl)nonyl] nonanedioic acid, 1-t-butyl, 9-ethyl ester, acetate.—A solution of 5.3 g. of 2-acetyl-2-[4-hydroxy-1-(1-propynyl) nonyl]nonanedioic acid, 1-tert-butyl 9-ethyl ester in 50 ml. of pyridine and 6.4 ml. of acetic anhydride is kept at 25° C. for 16 hours. The mixture is diluted with water, extracted with ether and the extract is washed with 2 N HCl, water and dried. Evaporation of the extract and chromatography of the residue on alumina (neutral, Activity 3) followed by elution with benzene affords 3.6 g. of product, a viscous oil, $\lambda_{max.}^{film}$ 5.78 (s) (carbonyl) $\mu$ NMR: 4.86 (broad multiplet, C–12 H), 4.09 (q, J=7 cps., ethyl $CH_2$), 2.85 (broad multiplet, C–9 H), 2.26 (multiplet, C–2 protons), 2.16 and 2.18 (acetyl $CH_3$), 2.00 (s, acetate $CH_3$), 1.75 and 1.78 (propynyl $CH_3$), 1.45 and 1.47 (t-butyl protons), 1.23 (t, J=7 cps., ethyl $CH_3$).

Analysis.—Found (percent): C, 69.26; H, 9.62. $C_{31}H_{52}O_7$ requires (percent): C, 69.37; H, 9.77.

(m) 2-acetyl-2-[4-hydroxy - 1 - (1 - propenyl)nonyl]-nonanedioic acid, 1-t-butyl, 9-ethyl ester, acetate.—A solution of 4.1 g. of 2-acetyl-2-[4-hydroxyl-1-(1-propynyl) nonyl]nonanedioic acid, 1-tert-butyl 9-ethyl acetate in 40 ml. of ethyl acetate is added to 0.8 g. of 2% $Pd/CaCO_3$ prehydrogenated in 40 ml. of ethyl acetate and the mixture is hydrogenated at 25° C. and atmospheric pressure. After 1 equivalent of $H_2$ is absorbed (20 minutes), the mixture is filtered, evaporated and the residue chromatographed on alumina (neutral, Activity 3). Elution with benzene affords 2.7 g. of product, a clear oil, $\lambda_{max.}^{film}$ 5.80 (s) (carbonyl)

NMR: 4.6–5.8 (diffuse multiplet, C–12 H and olefinic protons), 4.10 (q, J=7 cps., ethyl $CH_2$), 2.97 (broad multiplet, C–9 H), 2.26 (multiplet, C–2 protons), 2.14 (s, acetyl $CH_3$), 2.00 (s, acetate $CH_3$), 1.61 and 1.63 (d, J=6.5 cps., propenyl $CH_3$), 1.48 (s, t-butyl protons), 1.23 (t, J=7 cps., ethyl $CH_3$) p.p.m.

*Analysis.*—Found (percent): C, 69.20; H, 9.80. $C_{31}H_{51}O_7$ requires (percent): C, 69.11; H, 10.10.

(n) 8-acetyl - 12 - hydroxy - 9 - (1 - propenyl)heptadecanoic acid, ethyl ester, acetate.—p-Toluenesulfonic acid (82 mg.) is added to 2.3 g. of 2-acetyl-2-[4-hydroxy-1-(1-propenyl)nonyl] nonanedioic acid, 1-tert-butyl, 9-ethyl ester, acetate, stirring under nitrogen at 110° C. and the mixture is stirred for 1¼ hours. The cooled mixture is diluted with ether, washed with 5% $KHCO_3$, water and dried. Evaporation and chromatography of the residue on neutral alumina (Activity 3) followed by elution with 1:1 hexanebenzene affords 0.9 g. of the title product, a 2:1 mixture of 2 close stereoisomers on TLC and GPC, $$\lambda_{max.}^{film} 5.75 \text{ (s) (carbonyl) } \mu$$

NMR: 4.6–5.8 (diffuse multiplet, C–12 and olefinic protons), 4.09 (q, J=7 cps., ethyl $CH_2$), 1.9–2.8 (10 proton multiplet; acetyl $CH_3$, acetate $CH_3$, C–2, C–8 and C–9 protons), 1.59 (d, J=7 cps., propenyl $CH_3$), 1.23 (t, J=7 cps., ethyl $CH_3$) p.p.m.

*Analysis.*—Found (percent): C, 71.22; H, 10.60. $C_{26}H_{46}O_5$ requires (percent): C, 71.19; H, 10.57.

(o) 8-acetyl-12-hydroxy - 9 - (1 - propenyl)heptadecanoic acid.—The product of step (n) (6.9 g.) is stirred at 25° C. for 4.5 hrs. in 100 ml. of ethanol and 100 ml. of 1 N aqueous sodium hydroxide. Dilute the mixture with water and extract with ether to obtain 6.1 g. of the title compound, $$\lambda_{max.}^{film} 3.0, 5.9\mu$$

NMR: 5.3 (broad multiplet, olefinic proton), 2.07 and 2.15 (singlets, acetyl $CH_3$), 1.61 (doublet, J=6 cps., propenyl $CH_3$) p.p.m.

(p) 8-acetyl - 12 - hydroxy - 9 - (1-propenyl)heptadecanoic acid, methyl ester.—The product of step (o) (6.0 g.) is treated with excess diazomethane in ethyl ether for 1 hr. at 25° C. Decompose the excess diazomethane with acetic acid, wash the mixture with water and evaporate to obtain 5.8 g. of the title compound, $$\lambda_{max.}^{film} 3.0, 5.75, 5.85\mu$$

NMR: 5.3 (broad multiplet), 3.65 (3 proton singlet, methyl ester), 2.08, 2.15 (singlets, acetyl $CH_3$), 1.60 (doublet, J 6 cps., propenyl $CH_3$) p.p.m.

(q) 8 - acetyl - 12 - (tetrahydropyran-2-yloxy)-9-(1-propenyl)heptadecanoic acid, methyl ester.—Stir the product of step (p) (5.7 g.) with 50 mg. of p-toluenesulfonic acid and 3.64 g. of dihydropyran in 53 ml. of benzene for 20 minutes at 25° C. Dilute the mixture with ether, wash with water, evaporate and chromatograph the residue on neutral alumina to obtain 4.0 g. of the title compound, $$\lambda_{max.}^{film} 5.80, 5.90\mu$$

NMR: 5.3 (broad multiplet, olefinic protons), 3.65 (singlet, methyl ester), 2.05 and 2.14 (singlets, acetyl $CH_3$), 1,62 (doublet, J 5 cps., propenyl $CH_3$) p.p.m.

(r) 2 - (3' - tetrahydropyranyloxyoctyl) - 3 - (6'-carbomethoxyhexyl) levulinaldehyde.—The product of step (q) (1.8 g.) is ozonized in 70 ml. of methylene chloride and 0.32 ml. of pyridine at −70° C. until a blue color developes. Treat the cold solution with 2.32 g. of powdered zinc and 4.7 ml. of acetic acid. After stirring at 25° C. for 1 hr., filter the mixture, dilute the filtrate with ether, wash with water and evaporate. The resulting residue is dissolved in benzene, filtered through alumina and evaporated to obtain 1.5 g. of the title compound, $$\lambda_{max.}^{film} 5.8\mu$$

NMR: 9.55 (multiplet, aldehyde proton), 3.65 (singlet, methyl ester), 2.24 and 2.16 (singlets, acetyl $CH_3$) p.p.m.

(s) 8-acetyl - 12 - hydroxy - 9 - (1-propynyl)heptadecanoic acid, ethyl ester.—Stir 9.7 g. of 2-acetyl-2-[1-(1-propynyl) - 4-(tetrahydropyran-2-yloxy)nonyl] nonanedioic acid, 1-tert-butyl-9-ethyl ester [Example 2(j)] under nitrogen at a temperature of 150° C. and add 2.44 g. of calcium iodide. Continue stirring at 150° for 25 minutes, cool and dissolve the reaction product in ether and water. Separate and wash the ether layer with aqueous sodium chloride solution, dry over $MgSO_4$ and evaporate. Chromatography of the residue on neutral alumina and elution with 1:9 ether-benzene affords 2.2 g. of the title product, $$\lambda_{max.}^{film} 2.9 \text{ (hydroxyl) } 5.8 \text{ (carbonyl) } \mu$$

(t) 8 - acetyl - 12-hydroxy-9-(1-propenyl)heptadecanoic acid, ethyl ester.—Add a solution of 7.1 g. of 8-acetyl-12-hydroxy - 9 - (1-propynyl) heptadecanoic acid, ethyl ester [step (s)] in 100 ml. of ethyl acetate to 1.4 g. of 10% Pd/charcoal prehydrogenated in 100 ml. of ethyl acetate and hydrogenate at 25° and atmospheric pressure until 1 equivalent of hydrogen is absorbed. Filter the catalyst and evaporate to obtain 7.0 g. of the title product;

$$\lambda_{max.}^{film} 2.9 \text{ (hydroxyl), } 5.8 \text{ (carbonyl), } 13.8 \text{ (double bond) } \mu$$

mass spec; m./e. 396 (molecular ion).

(u) 8 - acetyl - 9 - (1-propenyl)-12-(tetrahydropyran-2-yloxy)heptadecanoic acid, ethyl ester.—Treat a solution of 7.2 g. of 8-acetyl-12-hydroxy-9-(1-propenyl) heptadecanoic acid, ethyl ester [step (t)] and 4.8 g. of dihydropyran in 125 ml. of benzene with 280 mg. of p-toluenesulfonic acid and stir at 25° for 20 minutes. Dilute the reaction mixture with ether, wash with water, dry and evaporate. Chromatograph the residue on neutral alumina and elute with 1:1 benzene-hexane to obtain 2.8 g. of the title product, $$\lambda_{max.}^{film} 5.7 \text{ and } 5.8 \text{ (carbonyls), } 13.7 \text{ (double bond)}\mu$$

(v) 8 - acetyl - 9 - (1-propynyl)-12-(tetrahydropyran-2-yloxy) heptadecanoic acid, ethyl ester.—Treat a solution of 1.3 g. of 8-acetyl-12-hydroxy-9-(1-propynyl) heptadecanoic acid, ethyl ester [step (s)] and 0.87 g. of dihydropyran in 25 ml. of benzene with 50 mg. of p-toluenesulfonic acid and stir at 25° for 20 minutes. Dilute the reaction mixture with ether, wash with water, dry and evaporate to obtain 1.6 g. of the title product, $$\lambda_{max.}^{film} 5.75 \text{ and } 5.80 \text{ (carbonyls)}$$

(w) 8 - acetyl - 9 - (1-propenyl)-12-(tetrahydropyran-2-yloxy)heptadecanoic acid, ethyl ester.—Add a solution of 0.5 g. of 8-acetyl-9-(1-propynyl)-12-(tetrahydropyran-2-yloxy)heptadecanoic acid, ethyl ester [step (v)] in 10 ml. of ethyl acetate to 0.1 g. of 10% Pd/charcoal prehydrogenated in 15 ml. of ethyl acetate and hydrogenate at 25° and atmospheric pressure until 1 equivalent of hydrogen is absorbed. Filter the catalyst and evaporate to obtain 0.47 g. of the title product.

(x) 2 - (3' - tetrahydropyranyloxyoctyl) - 3 - (6'-carboethoxyhexyl)levulinaldehyde.—The product of step (w) (2.3 g.) is ozonized in 70 ml. of methylene chloride and 0.4 ml. of pyridine at −70° C. until a blue color develops followed by treating the cold solution with 3.0 gm. of powdered zinc and 6.0 ml. of acetic acid. After stirring at 25° C. for one-half hour, filter the mixture, dilute the filtrate with ether, wash with water and evaporate. The resulting residue is dissolved in benzene, filtered through alumina and evaporated to obtain 1.6 g. of the title compound, $$\lambda_{max.}^{film} 5.75, 9.70\mu$$

NMR: 9.6 (multiplet, aldehyde proton), 4.13 (quartet), 2.18 (singlet).

Example 3

The process of Procedure A is repeated substituting, in step (a), appropriately-substituted starting materials and the following 2,3-disubstituted levulinaldehydes are obtained:

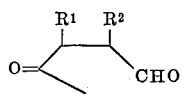

| $R^1$ | $R^2$ |
|---|---|
| $CH_2(CH_2)_{18}CH_3$ | $CH_2(CH_2)_{18}CH_3$ |
| $CH_2(CH_2)_4CH_2CO_2CH_2(CH_2)_4CH_3$ | $CH_2(CH_2)_{18}CH_3$ |
| $CH_2(CH_2)_4CH_2CO_2CH_3$ | $CH_2CH_2CH[OCCH_2(CH_2)_4CH_3](CH_2)_4CH_3$ (with O= on the OC group) |

Example 4.—4,5-dimethyl-2-cyclopentene-1-one

Treat a solution of 11.8 g. of 2,3-dimethyllevulinaldehyde in 2 liters of water with 220 ml. of 5 N sodium hydroxide and stir for 15 min. at room temperature. Extract the mixture with methylene chloride and distill and washed and dried extract to obtain 6.3 g. of the title product, B.P. 59–63°/10 mm., $\lambda_{max.}^{film}$ 5.88μ, 6.30μ, $\lambda_{max.}^{EtOH}$ 220 mμ (ε 9,000)

Found: C, 76.52; H, 9.46. Calcd. for $C_7H_{10}O$: C, 76.32; H, 9.15. NMR: 7.59 (1 proton quartet J 6 and 2.5 cps., C–3 H). 6.13 (1 proton quartet, J 6 and 2.0 cps., C–2 H), 2.55 (1 proton diffuse multiplet, C–4 H), 1.88 (1 proton octet, J 7.5 and 2.5 cps., C–5 H), 1.22 and 1.17 (3 proton doublets, J 7 c.p.s., methyl groups) p.p.m.

Example 5.—4 - (3' - tetrahydropyranyloxyoctyl)-5-(6'-carboxyhexyl)-2-cyclopenten-1-one and methyl ester thereof Treat a solution of 1.5 g. of 2-(3'-tetrahydropyranyloxyoctyl)-3 - (6' - carbomethoxyhexyl)levulinaldehyde (Example 2) in 200 ml. of dioxane and 92 ml. of water with 6.1 ml. of 5 N aqueous sodium hydroxide and stir the mixture at 25° C. for 0.5 hour. Dilute the mixture with water, acidify and extract with ether. Evaporate the extract and chromatograph the residue on silica to obtain 1.2 g. of the title compound, $\lambda_{max.}^{film}$ 5.80, 5.88, 6.30μ

NMR: 7.58 and 6.12 (multiplets, olefinic protons), 4.65 and 3.60 (multiplets, O—CH protons), 2.33 triplet, J 7 cps., methylene adjacent to carbonyl) p.p.m.

If the reaction is terminated after 3–5 minutes, the methyl ester of the title compound is isolated.

Example 6.—4-(3'-acetoxyoctyl)-5-(6'-carboethoxyhexyl)-2-cyclopenten-1-one

2 - (3' - acetoxyoctyl)-3-(6'-carboethoxyhexyl)levulinaldehyde is made up into a 0.5% solution by weight in a 0.1 N solution of NaOH in 2:1 dioxane-water for 10 minutes at 25° C. The mixture is evaporated to dryness in a vacuum and the residue is extracted with methylene chloride. Evaporation leaves a 75% yield of neutral product which is chromatographed on alumina to obtain pure title compound, also named ethyl ester, acetate of dihydro PGA₁, with infrared and ultraviolet spectra, nuclear magnetic resonance spectrum, gas phase chromatography, mass spectrum and micro analysis consistent with the structure.

Example 7.—4-(3'-hydroxyoctyl)-5-(6'-carboxyhexyl)-2-cyclopenten-1-one

A solution of 0.74 g. of 4-(3'-tetrahydropyranyloxyoctyl) - 5-(6'-carboxyhexyl)-2-cyclopenten-1-one (Example 5) in 50 ml. of tetrahydrofuran and 50 ml. of 1 N hydrochloric acid is stirred at 25° C. for 0.5 hours. Dilute the mixture with water, extract with ether, evaporate and chromatograph the residue on silica to obtain 0.33 g. of the title compound, $\lambda_{max.}^{film}$ 3.0, 5.85, 6.30μ

NMR: 7.60 and 6.13 (multiplets, olefinic protons), 3.66 (multiplet, O—CH proton), 2.33 (triplet, J 7 cps., methylene adjacent to carbonyl) p.p.m.

Example 8

The procedure of Example 4 is repeated substituting the 2,3-disubstituted levulinaldehydes of Example 3 as starting materials. The following 4,5-disubstituted-2-cyclopenten-1-ones are obtained.

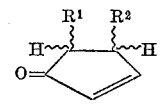

| $R^1$ | $R^2$ |
|---|---|
| $CH_2(CH_2)_{18}CH_3$ | $CH_2(CH_2)_{18}CH_3$ |
| $CH_2(CH_2)_4CH_2CO_2CH_2(CH_2)_4CH_3$ | $CH_2(CH_2)_{18}CH_3$ |
| $CH_2(CH_2)_4CH_2CO_2CH_3$ | $CH_2CH_2CH[OCCH_2(CH_2)_4CH_3](CH_2)_4CH_3$ |

Example 9.—4,5-dimethyl-2,3-epoxycyclopentanone

Add 10 ml. of 10% sodium hydroxide dropwise to a ice-cooled mixture of 9.1 g. of 4,5-dimethyl-2-cyclopenten-1-one and 27 ml. of 30% hydrogen peroxide in 35 ml. of methanol. After stirring the mixture at 0° C. for 20 min., dilute with 150 ml. of water and extract with ether. Distill the washed and dried extract to obtain 5.3 g. of the product, B.P. 75–77°/10 mm., $\lambda_{max.}^{film}$ 5.75μ

NMR: 3.72 and 3.35 (1 proton multiplets, C–2 and C–3 H's), 2.04 (2 proton multiplet, W ½–43 cps., C–4 and C–5 H's), 1.12 (6 proton multiplet, methyl groups) p.p.m.

Examples 10.—4(3'-hydroxyoctyl)-5-(6'-carboxyhexyl)-2,3-epoxycyclopentanone

An ice-cooled solution of 0.23 g. of 4-(3'-hydroxyoctyl)-5-(6' - carboxyhexyl) - 2 - cyclopenten - 1-one (Example 7) in 4 ml. of methanol and 1 ml. of water is treated with 0.2 ml. of 30% hydrogen peroxide and 0.87 ml. of 1 N sodium hydroxide and the mixture stirred at 0° C. for 10 minutes. Acidify the mixture with acetic acid, dilute with water and extract with ether to obtain 0.22 g. of the title compound, $\lambda_{max.}^{film}$ 3.0, 5.85μ

NMR: 3.72 and 3.37 (multiplets, C–2 and C–3 protons), 3.65 (multiplet, C–3 octyl proton), 2.33 (triplet, J 7 cps., methylene adjacent to carboxyl).

Example 11.—4 - (3' - tetrahydropyranyloxyoctyl)-5-(6'-carboxyhexyl) - 2,3 - epoxycyclopentanone and methyl ester The procedure of Example 10 is repeated substituting 4 - (3' - tetrahydropyranyloxyoctyl) - 5 - (6' - carboxyhexyl)-2-cyclopenten-1-one as starting material and the product is obtained. The methyl ester of Example 5 is converted by the procedure of Example 10 to the corresponding methyl ester.

Example 12

The procedure of Example 9 is repeated substituting the 4,5-disubstituted-2-cyclopenten-1-ones of Example 8 as starting materials and the following 4,5-disubstituted-2,3-epoxycyclopentanones are obtained:

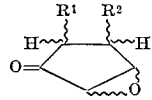

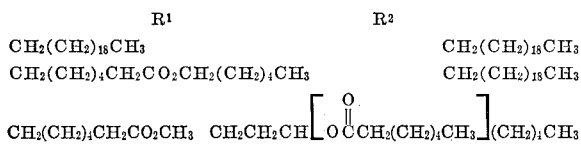

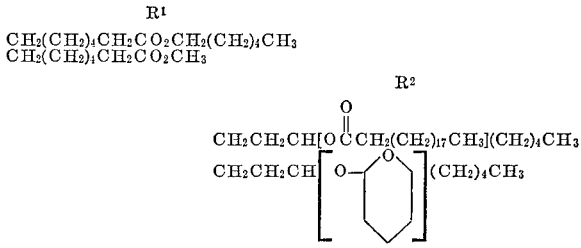

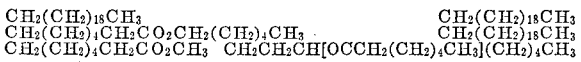

Example 13.—4,5-dimethyl-3-hydroxycyclopentanone

Add 4.6 g. of 4,5-dimethyl-2,3-epoxypentanone in 15 ml. of methanol to 2.0 g. of 10% palladized charcoal in 40 ml. of methanol and hydrogenate at 25° C. and atmospheric pressure. After an uptake of 1.1 M of hydrogen, filter and distill to obtain 1.4 g. of the product, B.P. 73–75°/0.1 mm., $\lambda_{max.}^{film}$ 3.0, 5.78$\mu$ NMR: 4.10 (1 proton multiplet, C–3 H), 3.76 (1 proton singlet, hydroxyl proton), 1.50–3.0 (4 proton complex, C–2, C–4 and C–5 H's), 1.11 (6 proton multiplet, methyl groups) p.p.m.

Example 14.—4 - (3' - hydroxyoctyl) - 5 - (6'-carboxyhexyl)-3-hydroxycyclopentanone and 3' - tetrahydropyranyl ether thereof (a) A solution of 200 mg. of 4-(3'-hydroxyoctyl)-5-(6' - carboxyhexyl)-2,3-epoxycyclopentanone (Example 10) in 5 ml. of methanol is added to 100 mg. of 10% Pd/c in 10 ml. of methanol and 0.1 ml. of saturated aqueous sodium acetate and the mixture hydrogenated at 25° C. and atmospheric pressure. Filter, evaporate and chromatograph the residue on silica to obtain the title compound.

(b) The above reaction is repeated substituting 4-(3'-tetrahydropyranyloxy-octyl) - 5 - (6'-carboxyhexyl)-2,3-epoxycyclopentanone (Example 11) as starting material and the resulting product, 4-(3'-tetrahydropyranyloxy-octyl)-5-(6' - carboxyhexyl)-3-hydroxycyclopentanone, is hydrolyzed with 0.5 N hydrochloric acid in 50% aqueous tetrahydrofuran at 25° C. for 0.5 hr. to obtain the title compound.

Example 15.—4-(3'-acetoxyoctyl)-5-(6'-carboethoxyhexyl)-3-hydroxycyclopentanone The procedure of Example 14 is repeated substituting 4-(3' - acetoxyoctyl) - 5 - (6' - carboethoxyhexyl) - 2,3-epoxycyclopentanone as starting material and the product is obtained.

Example 16

The procedure of Example 13 is repeated substituting the 4,5-disubstituted-2,3-epoxycyclopentanones of Example 12 and corresponding 2,3-epoxides obtained by entirely analogous processes as starting materials and the following 4,5-disubstituted-3-hydroxycyclopentanones are obtained:

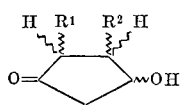

Example 17

The procedure of Example 13 is repeated, substituting for the palladized charcoal catalyst, equivalent amounts of the following catalysts: palladium on carbon, platinum, and unsupported palladium. Substantially the same results are obtained.

Example 18

The product of Example 4 is separated into its 4,5-cis and 4,5-trans isomers by preparative scale gas liquid chromatography using a 5 foot column of 20% SE–30 (a silicone rubber gum) on Chromosorb W (an inert chromatographic support) at a column temperature of 104° C. with nitrogen as a carrier gas at 2 pounds per square inch gauge pressure. The trans-isomer is converted to the corresponding 4,5-trans-4,5-dimethyl-3-hydroxycyclopentanone by the procedures of Examples 9 and 13.

Example 19

(aa) 4 - (3'-methanesulfonyloxy-1'-octenyl)-5-(6'-carboxy-2'-hexenyl)-2-cyclopenten - 1 - one.—Treat an ice-cooled solution of 4-(3'-hydroxy-1'-octenyl)-5-(6'-carboxy-2'-hexenyl)-2-cyclopenten-one in pyridine with one equivalent of methanesulfonyl chloride and keep the mixture at 0° for sixteen hours. And the reaction mixture to water, acidify with hydrochloric acid and extract with ether. After washing the extract with water, dry and evaporate under reduced pressure to obtain the title product.

(bb) 4 - (3' - formyloxy-1'-octenyl)-5-(6'-carboxy-2'-hexenyl)-2-cyclopenten-1-one.—Reflux a solution of 4-(3' - methanesulfonyloxy - 1' - octenyl)-5-(6'-carboxy-2'-hexenyl)-2-cyclopenten-1-one and four equivalents of tetraethylammonium formate in acetone for seventeen hours. Remove the acetone under reduced pressure, add water and extract with ether. Wash the extract with water, dry, evaporate and chromatograph the residue on silica gel to obtain the title product.

(cc) 4 - (3' - hydroxy-1'-octenyl)-5-(6'-carboxy-2'-hexenyl)-2,3-epoxycyclopentanone.—Treat an ice cooled solution of 4-(3'-formyloxy-1'-octenyl)-5-(6'-carboxy-2'-hexenyl)-2-cyclopenten-1-one and four equivalents of hydrogen peroxide in 20% aqueous methanol with 2.5 equivalents of 10% sodium hydroxide solution and stir the mixture at 0° for one-half hour. Acidify the mixture with acetic acid, dilute with water and extract with ether to obtain the title product.

(dd) 4 - (3' - hydroxyoctyl)-5-(6'-carboxyhexyl)-3-hydroxycyclopentanone.—Add a methanolic solution of 4 - (3' - hydroxy-1'-octenyl)-5-(6'-carboxy-2'-hexenyl)-2,3-epoxycyclopentanone to a suspension of 10% Pd/C in methanol containing 1% of saturated aqueous sodium acetate solution and hydrogenate at 25° and atmospheric pressure until three molar equivalents of hydrogen are absorbed. Filter, evaporate and chromatograph the residue on silica to obtain the title product. The identity of the compound is confirmed by comparing with previously produced compounds of the same formula.

As will be obvious to those skilled in the art, because of centers of asymmetry, many of the compounds of Formula I prepared by this invention are capable of being optical isomers. It is a matter of common knowledge and experience that naturally-occurring prostaglandins and metabolites thereof are optically-active. The instant total synthesis provides means to obtain products of Formula I either in racemic or in optically-active form. In the product of the synthesis which has not included a suitable resolution stage (e.g., by resolving the diastereomeric mixed salt of an optically-active base with an appropriate acidic intermediate shown herein, or by resolving a diasteromeric mixed ester of a carbinol intermediate shown herein with an optically-active acylating agent), the compounds of Formula I prepared by the invention will be present as racemates. The optically-active enantiomorphs can be prepared using optically active intermediates or they can be obtained by resolving racemic products of Formula I by well-known procedures.

We claim:
1. A compound of the formula:

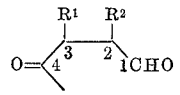

wherein
$R^1$ is 6'-carbomethoxyhexyl and $R^2$ is 3'-tetrahydropyranyloxyoctyl;
$R^1$ is 6'-carboethoxyhexyl and $R^2$ is 3'-tetrahydropyranyloxyoctyl; or
$R^1$ is 6'-carboethoxyhexyl and $R^2$ is -acetoxyoctyl.

No references cited.

NORMA S. MILESTONE, Primary Examiner

U.S. Cl. X.R.

260—345.7, 410.9 R, 413